US012799005B2

(12) United States Patent
Cui et al.

(10) Patent No.: US 12,799,005 B2
(45) Date of Patent: Nov. 17, 2026

(54) LITHIUM EXTRACTION THROUGH PULSED ELECTROCHEMICAL INTERCALATION METHOD

(71) Applicant: The Board of Trustees of the Leland Stanford Junior University, Stanford, CA (US)

(72) Inventors: Yi Cui, Stanford, CA (US); Steven Chu, Menlo Park, CA (US); Chong Liu, Chicago, IL (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 600 days.

(21) Appl. No.: 17/945,759

(22) Filed: Sep. 15, 2022

(65) Prior Publication Data

US 2023/0075724 A1 Mar. 9, 2023

Related U.S. Application Data

(63) Continuation of application No. PCT/US2021/022604, filed on Mar. 16, 2021.

(Continued)

(51) Int. Cl.
*C25C 1/22* (2006.01)
*C02F 1/469* (2023.01)

(Continued)

(52) U.S. Cl.
CPC .............. *C02F 1/4691* (2013.01); *C25C 1/22* (2013.01); *C25C 7/02* (2013.01); *B01D 61/428* (2022.08)

(58) Field of Classification Search
None
See application file for complete search history.

(56) References Cited

U.S. PATENT DOCUMENTS

2008/0248360 A1* 10/2008 Mizukami ........... H01M 8/1007 429/494
2014/0076734 A1 3/2014 Calvo et al.

(Continued)

OTHER PUBLICATIONS

Kim et al. "An electrochemical cell for selective lithium capture from seawater", Environmental Science & Technology, 2015, 49, 9415-9422 (Year: 2015).*

(Continued)

*Primary Examiner* — Stefanie S Wittenberg
(74) *Attorney, Agent, or Firm* — Kilpatrick Townsend & Stockton LLP

(57) ABSTRACT

Electrochemical methods using intercalation chemistry to extract Li from seawater using the TiO2-coated FePO4 electrode. The difference in the thermodynamic intercalation potentials, as well as the diffusion barriers between Li and Na, could provide near 100% selectivity towards Li interaction when Li/Na molar ratio is higher than 10-3. For lower Li/Na ratio as in the authentic seawater case, pulsed-rest and pulse-rest-reverse pulse-rest electrochemical methods were developed to lower the intercalation overpotential and it was proven to successfully boost the Li selectivity. Moreover, the pulse-rest-reverse pulse-rest method can also promote electrode crystal structure stability during the co-intercalation of Li and Na and prolong the lifetime of the electrode. Finally, 10 cycles of successful and stable Li extraction with 1:1 of Li to Na recovery from authentic seawater were demonstrated, which is equivalent to the selectivity of ~1.8×104. Also, with lake water of higher initial Li/Na ratio of 1.6× 10-3, Li extraction with more than 50:1 of Li to Na recovery was achieved.

15 Claims, 18 Drawing Sheets

Related U.S. Application Data

(60) Provisional application No. 62/990,144, filed on Mar. 16, 2020.

(51) Int. Cl.

| | |
|---|---|
| ***C25C 7/02*** | (2006.01) |
| *B01D 61/42* | (2006.01) |

(56) References Cited

U.S. PATENT DOCUMENTS

2018/0133619 A1 5/2018 Snydacker
2018/0138495 A1 5/2018 Solan et al.

OTHER PUBLICATIONS

Water Science School, USGS, Saline Water and Salinity. (Year: 2018).*

Zhao et al. "Li extraction from high Mg/Li ratio brine with LiFePO4/FePO4 as electrode materials", Hydrometallurgy, 133, 2013 (Year: 2013).*

Marothu et al. Electromembrane Extraction—A novel extraction technique for pharmaceutical, chemical, clinical and environmental analysis, Journal of Chromatographic Science, 2013 (Year: 2013).*

Moreau et al. Structure and stability of sodium intercalated phases in olivine FePO4, Chem. Mater., 22, 4126-4128, 2010 (Year: 2010).*

International Patent Application No. PCT/US2021/022604, International Search Report and Written Opinion of the International Searching Authority, Sep. 27, 2021, 11 pages.

Zhao, Z. et al., "Li extraction from high Mg/Li ratio brine with $LiFePO_4/FePO_4$ as electrode materials," Hydrometallurgy, 133:75-83, 2013.

Extended European Search Report dated Oct. 4, 2024 in related European application number 21772425.1; eight pages.

Chong, Liu, et al., "Lithium Extraction from Seawater through Pulsed Electrochemical Intercalation", Joule vol. 4, No. 7, pp. 1459-1469 (Jul. 1, 2020).

Naumov, A. V. & Naumova, M. A. Modern state of the world lithium market. Russ. *J. Non-Ferr. Met.* 51, 324-330 (2010).

Martin, G., Rentsch, L., Höck, M. & Bertau, M. Lithium market research—global supply, future demand and price development. *Energy Storage Mater.* 6, 171-179 (2017).

Bloomberg NEF, Electric Vehicle Outlook 2019.

Bloomberg NEF, EV-Volumes—The Electric Vehicle World Sales Database, 2019.

Grosjean, C., Miranda, P. H., Perrin, M. & Poggi, P. Assessment of world lithium resources and consequences of their geographic distribution on the expected development of the electric vehicle industry. *Renew. Sustain. Energy Rev.* 16, 1735-1744 (2012).

Bardi, U. Extracting Minerals from Seawater: An Energy Analysis. Sustainability 2, 980-992 (2010).

McEachern, P. *Lithium Recovery from Oilfield Produced Water Brine & Wastewater Treatment.* (2017).

Allison, E. & Mandler, B. Petroleum and the Environment. 102 (2018).

Chitrakar, R., Makita, Y., Ooi, K. & Sonoda, A. Synthesis of Iron-Doped Manganese Oxides with an Ion-Sieve Property: Lithium Adsorption from Bolivian Brine. *Ind. Eng. Chem. Res.* 53, 3682-3688 (2014).

Chitrakar, R., Makita, Y., Ooi, K. & Sonoda, A. Lithium recovery from salt lake brine by H2 TiO3. *Dalton Trans.* 43, 8933-8939 (2014).

Hoshino, T. Innovative lithium recovery technique from seawater by using world-first dialysis with a lithium ionic superconductor. *Desalination* 359, 59-63 (2015).

Hoshino, T. Preliminary studies of lithium recovery technology from seawater by electrodialysis using ionic liquid membrane. *Desalination* 317, 11-16 (2013).

Zhu, Y., Xu, Y., Liu, Y., Luo, C. & Wang, C. Comparison of electrochemical performances of olivine NaFePO4 in sodium-ion batteries and olivine LiFePO4 in lithium-ion batteries. *Nanoscale* 5, 780-787 (2013).

Dixit, M. et al. Classical and Quantum Modeling of Li and Na Diffusion in FePO4. *J. Phys. Chem. C* 119, 15801-15809 (2015).

Wood, P. M. The potential diagram for oxygen at pH 7. *Biochem. J.* 253, 287-289 (1988).

Liu, C. et al. Rapid water disinfection using vertically aligned MoS2 nanofilms and visible light. *Nat. Nanotechnol.* 11, 1098-1104 (2016).

Liu, C. et al. A half-wave rectified alternating current electrochemical method for uranium extraction from seawater. *Nat. Energy* 2, 17007 (2017).

Padhi, A. K., Nanjundaswamy, K. S. & Goodenough, J. B. Phospho-olivines as Positive-Electrode Materials for Rechargeable Lithium Batteries. *J. Electrochem. Soc.* 144, 1188-1194 (1997).

Luo, J.-Y., Cui, W.-J., He, P. & Xia, Y.-Y. Raising the cycling stability of aqueous lithium-ion batteries by eliminating oxygen in the electrolyte. *Nat. Chem.* 2, 760-765 (2010).

Moreau, P., Guyomard, D., Gaubicher, J. & Boucher, F. Structure and Stability of Sodium Intercalated Phases in Olivine FePO4. *Chem. Mater.* 22, 4126-4128 (2010).

Ong, S. P. et al. Voltage, stability and diffusion barrier differences between sodium-ion and lithium-ion intercalation materials. *Energy Environ. Sci.* 4, 3680-3688 (2011).

Dathar, G. K. P., Sheppard, D., Stevenson, K. J. & Henkelman, G. Calculations of Li-Ion Diffusion in Olivine Phosphates. *Chem. Mater.* 23, 4032-4037 (2011).

Xu, S. et al. Lithium transport through lithium-ion battery cathode coatings. *J. Mater. Chem.* A 3, 17248-17272 (2015).

Li, Y. et al. Fluid-enhanced surface diffusion controls intraparticle phase transformations. *Nat. Mater.* 1 (2018).

García, G., Dieckhöfer, S., Schuhmann, W. & Ventosa, E. Exceeding 6500 cycles for LiFePO4/Li metal batteries through understanding pulsed charging protocols. *J. Mater. Chem.* A 6, 4746-4751 (2018).

Li, J., Murphy, E., Winnick, J. & Kohl, P. A. The effects of pulse charging on cycling characteristics of commercial lithium-ion batteries. *J. Power Sources* 102, 302-309 (2001).

Chandrasekar, M. S. & Pushpavanam, M. Pulse and pulse reverse plating—Conceptual, advantages and applications. *Electrochimica Acta* 53, 3313-3322 (2008).

Aryanfar, A. et al. Dynamics of Lithium Dendrite Growth and Inhibition: Pulse Charging Experiments and Monte Carlo Calculations. *J. Phys. Chem. Lett.* 5, 1721-1726 (2014).

Li, Y. et al. Current-induced transition from particle-by-particle to concurrent intercalation in phase-separating battery electrodes. *Nat. Mater.* 13, 1149-1156 (2014).

Weichert, K. et al. Phase Boundary Propagation in Large LiFePO4 Single Crystals on Delithiation. *J. Am. Chem. Soc.* 134, 2988-2992 (2012).

Bai, P., Cogswell, D. A. & Bazant, M. Z. Suppression of Phase Separation in LiFePO4 Nanoparticles During Battery Discharge. *Nano Lett.* 11, 4890-4896 (2011).

* cited by examiner

LITHIUM EXTRACTION THROUGH PULSED ELECTROCHEMICAL INTERCALATION METHOD

CROSS-REFERENCES TO RELATED APPLICATIONS

The present application is a continuation of International Application No. PCT/US2021/022604, filed Mar. 16, 2021, which claims the benefit of priority of U.S. Provisional Application No. 62/990,144 filed Mar. 16, 2020, the entire contents of which are incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC02-76SF00515 awarded by the Department of Energy. The Government has certain rights in the invention.

FIELD OF THE INVENTION

The present disclosure relates to extraction of lithium from brine, in particular to obtain lithium (Li) for the battery industry.

BACKGROUND

The global climate change and energy crisis pose a huge need to replace fossil fuel-based vehicles with electric vehicles powered by lithium-ion batteries. Consequently, the need for the lithium element will increase dramatically in the coming decades. Seawater contains above 200 billion tons of lithium, which is 5000 times more than the combination of land and brine-based resources. It is highly attractive to develop efficient methods to directly extract lithium from seawater to secure the supply of lithium. However, the chemically similar sodium (Na) in the seawater is 4 orders of magnitude more concentrated than lithium and poses considerable challenges in lithium extraction selectivity. Thus, there is a need for improved methods of obtaining lithium from brine.

BRIEF SUMMARY

In one aspect, the invention pertains to electrochemical methods and systems using intercalation chemistry to extract lithium from seawater.

In a first aspect, the methods and system utilize a pair of electrodes configured to enhance lithium selectivity and to lower intercalation overpotential. In some embodiments, the system utilizes $FePO_4$ electrodes. While use of $FePO_4$ is described herein, it is appreciated that any suitable material that can be configured for lithium selectivity can be used. The electrodes can be coated with a hydrophilic material, such as $TiO_2$, although any suitable hydrophilic material can be used. In some embodiments, the methods and system use a $TiO_2$-coated $FePO_4$ electrode. The difference in the thermodynamic intercalation potentials, as well as the diffusion barriers between lithium and sodium, could provide near 100% selectivity towards lithium interaction when Li/Na molar ratio is higher than $10^{-3}$. For lower Li/Na ratio as in the authentic seawater case, pulsed electrochemical intercalation methods were developed, including pulsed-rest and pulse-rest-reverse pulse-rest electrochemical methods, to lower the intercalation overpotential and were proven to successfully boost lithium selectivity.

In another aspect, the methods and system utilize a pulsed intercalation to promote stability of the electrode crystal structures during lithium extraction. In some embodiments, the pulsed intercalation method includes a pulse and rest period. In some embodiments, the pulsed method includes a pulse period, a rest period, a reverse-pulse period and rest period, which further promotes electrode crystal structure stability during the co-intercalation of lithium and sodium and prolong the lifetime of the electrode. The pulsed cycles can be repeated for many cycles (e.g. hundreds to thousands of times) to facilitate rapid, efficient extraction of lithium. The experiments detailed herein demonstrated 10 cycles of successful and stable lithium extraction with 1:1 of lithium to sodium recovery from authentic seawater, which is equivalent to the selectivity of ~$1.8\times10^4$. Also, with lake water of higher initial Li/Na ratio of $1.6\times10^{-3}$, lithium extraction with more than 50:1 of Li to Na recovery was achieved. Thus, the methods and system described herein can realize extraction of lithium from aqueous solutions having elevated dissolved sodium salts (Na) (e.g. seawater, lake water) in a rapid and efficient manner.

In one aspect, the invention pertains to a method of extracting lithium from an aqueous solution having lithium and dissolved sodium. In some embodiments, the methods entail: providing a pair of electrodes in contact within the aqueous solution, the pair of electrodes being configured for lithium selectivity; extracting lithium from the aqueous solution by electrochemical intercalation into a first electrode of the pair of electrodes; and recovering the lithium extracted into the first electrode into a freshwater solution. In some embodiments, the pair of electrodes include $FePO_4$. In some embodiments, the first electrode has an outer hydrophilic layer, such as a coating of $TiO_2$. In some embodiments, the method allows for lithium to sodium recovery of 50:1.

In another aspect, the methods include various electrochemical intercalation methods, which can be performed at a constant current applied or can be pulsed in cycles. The pulsed electrochemical intercalation can include pulse-rest periods or can include pulse-rest-reverse pulse-rest periods. In some embodiments, the pulse can be between 1 second(s) and 30 s (e.g. 10 s), the rest can be between 1 s and 30 s (e.g. 10 s) and the reverse pulse can be between 1 s and 30 s (e.g. 2 s). In some embodiments, any of the pulse, reverse-pulse and/or rest periods can be any duration between 0.5 s and 5 minutes, 0.5 s and 2 minutes, 0.5 s and 1 minutes. In some embodiments, the reverse-pulse is less than the pulse in duration. It is appreciated that the pulsed methods can include variations of the sequences and durations above.

In another aspect, the voltage applied in the electrochemical intercalation is within a water stable window of the aqueous solution for lithium extraction and recovery. In some embodiments, the aqueous solution is a seawater solution that has a sodium concentration of about 10 mg/L or higher. In some embodiments, the aqueous solution is lake water with an initial Li/Na ratio of $1.6\times10^{-3}$.

In another aspect, the invention pertains to a method of fabricating electrodes for lithium extraction from aqueous solution having lithium and sodium. The method can include steps of: fabricating a first electrode for use a working electrode in lithium extraction by: forming a $LiFePO_4$ electrode by coating a paste comprising $LiFePO_4$ onto a conductive substrate; delithiating the $LiFePO_4$ electrode to obtain an $FePO_4$ electrode; and forming an outer layer of a hydrophilic material over the $FePO_4$ electrode to lower the overpotential for lithium insertion in the electrode by intercalation. In some embodiments, the hydrophilic coating is deposited by atomic layer deposition. In some embodiments, the hydrophilic material is $TiO_2$.

In another aspect, the invention pertains to a method of fabricating a second electrode for use as a counter electrode in lithium extraction by electrochemical intercalation. The method can include: fabricating a $NaFePO_4$ electrode for use as the second electrode. Fabricating the second electrode can include steps of forming a $LiFePO_4$ electrode by coating a paste comprising $LiFePO_4$ onto a conductive substrate; delithiating the $LiFePO_4$ electrode to obtain an $FePO_4$ electrode; and performing intercalation of the $FePO_4$ electrode in a solution comprising Na to form a $NaFePO_4$ electrode to improve lithium selectivity during electrochemical intercalation between the first and second electrodes.

In still another aspect, the invention pertains to a system for lithium extraction from an aqueous solution having lithium and sodium. The system can include a pair of electrodes in contact with the aqueous solution, the pair of electrodes being configured for lithium selectivity such that electrochemical intercalation with the pair of electrodes extracts lithium from the aqueous solution. The pair of electrodes comprises a first electrode and a second electrode. In some embodiments, the first electrode is a $FePO_4$ electrode and the second electrode is a $NaFePO_4$ electrode. In some embodiments, the first electrode further include an outer layer of a hydrophilic material, such as $TiO_2$. The system can further include a conduit or container holding the aqueous solution, such that the first and second electrodes are disposed in the container or conduit in contact with the aqueous solution to allow extraction of lithium from the solution by electrochemical intercalation. The conduit or container can be fluidly coupled with a network of conduit or piping to facilitating replacement of the aqueous solution for additional cycles and replacement of the aqueous solution with a freshwater solution for subsequent lithium recovery.

In another aspect, the system includes a control unit operably coupled with the first and second electrodes so as to perform electrochemical intercalation with the first electrode as a working electrode and the second electrode as a counter electrode. The control unit is configured to: extract lithium from the aqueous solution by electrochemical intercalation into a first electrode of the pair of electrodes while the pair of electrodes are disposed in the aqueous solution; and recover the lithium extracted into the first electrode into a freshwater solution by use of another counter electrode. In some embodiments, the control unit is configured to apply a constant current during electrochemical intercalation. In other embodiments, the control unit is configured such that the electro electrochemical intercalation is pulsed in cycles. Pulsed intercalation can include pulse-rest period or can include pulse-rest-reverse pulse-rest periods. The duration of the pulse, rest and reverse-pulse period can be defined as described herein or according to any duration desired.

DESCRIPTION OF THE INVENTION

Figure 1A:
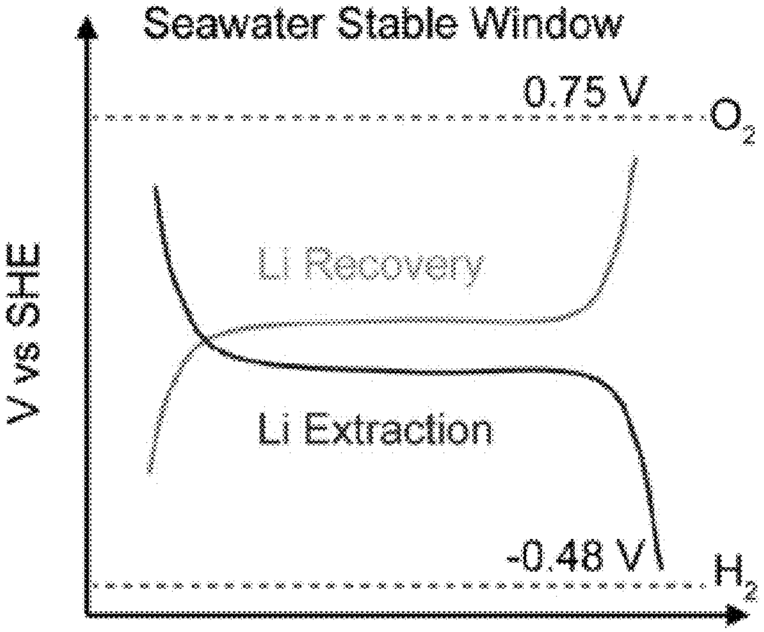
FIGS. 1A-1F shows an exemplary procedure of extracting lithium from seawater using electrochemical intercalation and associated aspects, in accordance with some embodiments.

The global climate change and energy crisis pose a huge need to replace fossil fuel-based vehicles with electric vehicles powered by lithium-ion batteries. Consequently, the need for the lithium element Li is expected to increase dramatically in the coming decades. Seawater contains above 200 billion tons of lithium, which is 5,000 times more than the combination of available land and brine-based resources. Therefore, it would be highly attractive to develop efficient methods to directly extract lithium from seawater to secure the supply of lithium. However, the chemically similar sodium salts (Na) in the seawater is more concentrated than lithium by four orders of magnitude, which poses a great challenge in lithium extraction selectivity. To overcome this challenge, an electrochemical method using intercalation chemistry to extract lithium from seawater has been developed using a $FePO_4$ electrode with a hydrophilic coating, specifically, a $TiO_2$-coated $FePO_4$ electrode. The difference in the thermodynamic intercalation potentials, as well as the diffusion barriers between lithium and sodium, can provide near 100% selectivity towards lithium interaction when Li/Na molar ratio is higher than $10^{-3}$. For lower Li/Na ratios, such as in the authentic seawater case, pulsed electrochemical methods to lower the intercalation overpotential were developed. Specifically, pulsed-rest and pulse-rest-reverse pulse-rest were developed and tested and proven to successfully boost lithium selectivity. Moreover, the pulse-rest-reverse pulse-rest method can also promote electrode crystal structure stability during co-intercalation of lithium and sodium and prolong lifetime of the electrode. Finally, experiments demonstrated 10 cycles of successful and stable lithium extraction with 1:1 of lithium to sodium recovery from authentic seawater, which is equivalent to the selectivity of $\sim 1.8 \times 10^4$. Also, with lake water of higher initial Li/Na ratio of $1.6 \times 10^{-3}$, lithium extraction with more than 50:1 of Li to Na recovery was achieved.

The fast development of energy storage technology and electronics has boosted global lithium demand from to ~180,000 tonnes of lithium carbonate equivalent in 2015, with projections as high as 1.6 M tonnes by 2030, where 1.4

M tonnes of the demand will be used in lithium-ion batteries for electric vehicles (EVs) and plug-in hybrid electric vehicles (PHEVs) By 2030, 28% of light-duty vehicles may be EVs and PHEVs, with ~80% EVs and by 2040, the majority of new light-duty vehicles sold will be EVs. This switch away from internal combustion engine vehicles is driven, in part, by concerns about climate change due to global greenhouse gas emissions and rising health concerns over particulate matter below 2.5 μm (PM) and $NO_x$ emissions from vehicles. Thus, there are a number of incentives to develop cost-effective technology to develop methods to extract lithium economically from a wider set of resources.

There are 43.6 million tonnes of lithium estimated on land sources, including 16.7 million tonnes in ores and 26.9 million tonnes in brines. The current method to extract lithium from brines, which typically have lithium concentrations between 100 and 1,000 ppm is based on evaporation and chemical precipitation which is highly time-intensive due to the pre-treatment process to concentrate lithium ions. Extraction by evaporation can require many months to years, and has a tremendous environmental impact as it requires large evaporation ponds. In contrast, there are 5,000 times more lithium present in seawater, estimated at above 200 billion tonnes, but where lithium concentration is only 0.180 ppm. More recently, lithium obtained from water produced in oil and gas extraction has also been considered. In the U.S., 2.5 billion gallons of water are produced each year during oil extraction. Assuming a concentration of 100 ppm lithium in the produced water, there are 0.350 million tonnes of lithium in the produced water that potentially be recovered each year.

In addition to the refining of lithium ores and the evaporation and chemical precipitation of brines, there are research efforts to develop sorbent materials such as $MnO_2$ or $H_2TiO_3$ to adsorb lithium. Also, there has been work to develop dialysis membranes for lithium extraction. However, the performance in these approaches still needs to be improved greatly. Thus, a more efficient lithium extraction technology that directly extracts lithium from seawater, or from produced water or brine lake sources without the time-consuming evaporation process would greatly increase the lithium production capacity to meet the anticipated demand for lithium in the coming decades.

In accordance with the approach described herein, the use of a $LiFePO_4$ electrode coated with a hydrophilic material (e.g., $TiO_2$-coated) combined with a pulsed electrochemical method allows extraction of lithium with high selectivity through intercalation chemistry. The intercalation chemistry naturally provides a high selectivity of lithium to sodium because lithium can provide higher structural stability in $FePO_4$ and has faster ion diffusivity. The $TiO_2$ coating was used to increase the interface contact between the working electrode and seawater. The pulsed electrochemical method lowered the overpotential to drive the intercalation of lithium into the $FePO_4$ crystal structure hence increase the selectivity and structural stability. Starting from an authentic seawater sample obtained at Half Moon Bay, California, experiments demonstrated 10 cycles of stable lithium extraction with a 1:1 Li/Na ratio. This is equivalent to a molar selectivity as high as $1.8\times10^4$. Besides seawater, experiments also demonstrated the use of electrochemical intercalation method to extract lithium from a higher initial lithium to sodium molar ratio solutions as well as lake water, which achieved 50.2±0.78%, 94.3±4.0%, ~100%, and 98.1±1.0% Li/(Li+Na) recovery from solution which has Li/Na ratio of $5.4\times10^{-5}$, $5.0\times10^{-4}$, $4.0\times10^{-3}$, and natural salt lake water, respectively.

Figure 1B:
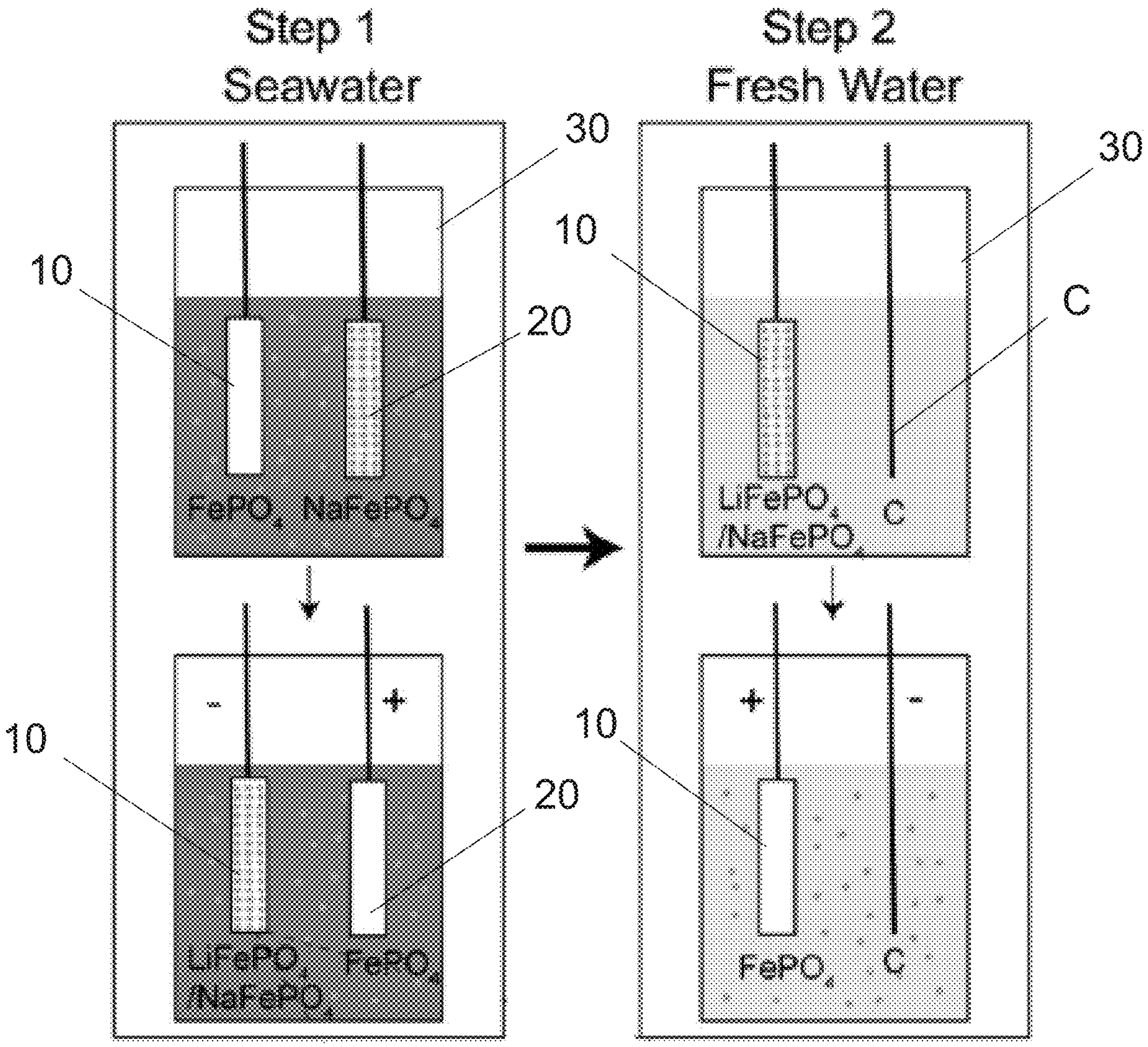
Figure 1C:
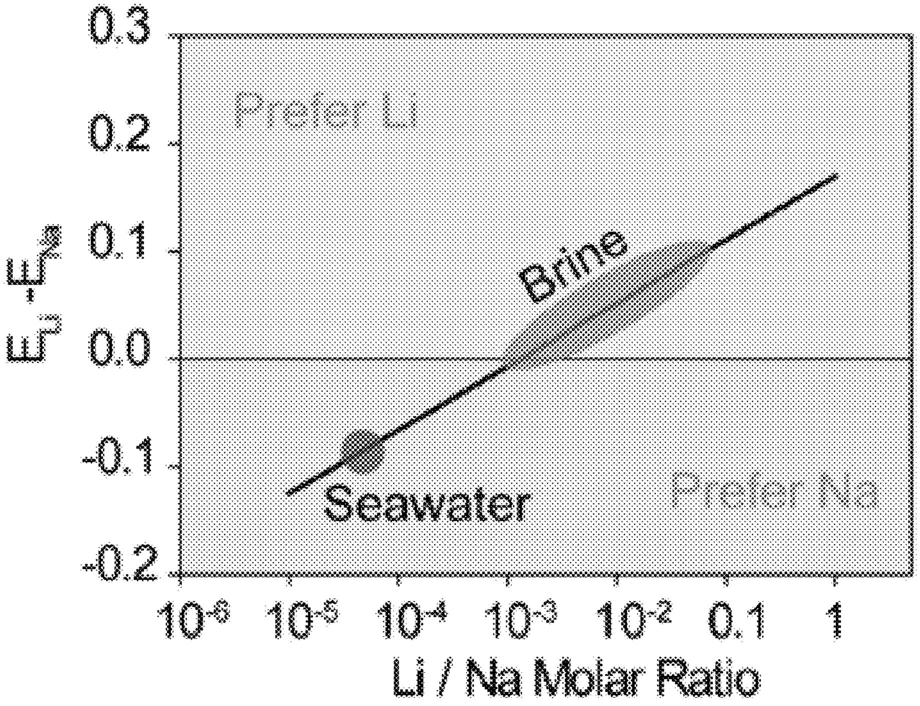
Figure 1D:
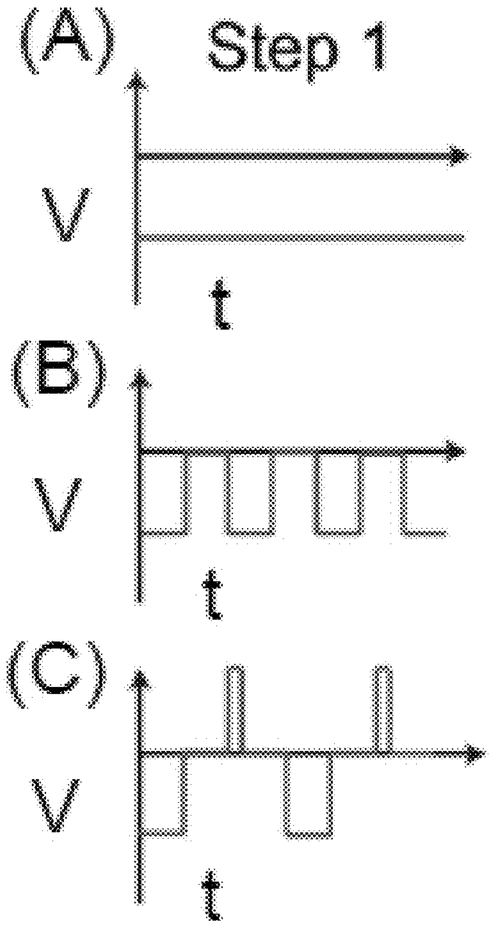
Figure 1E:
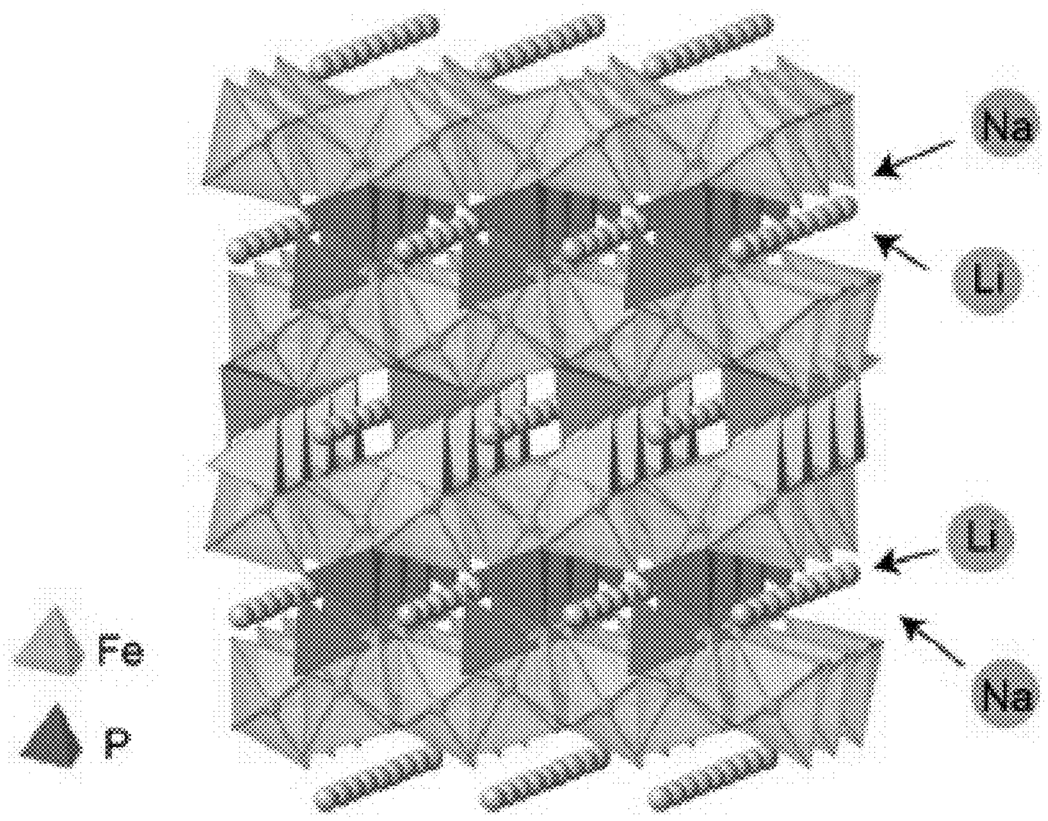
Figure 1F:
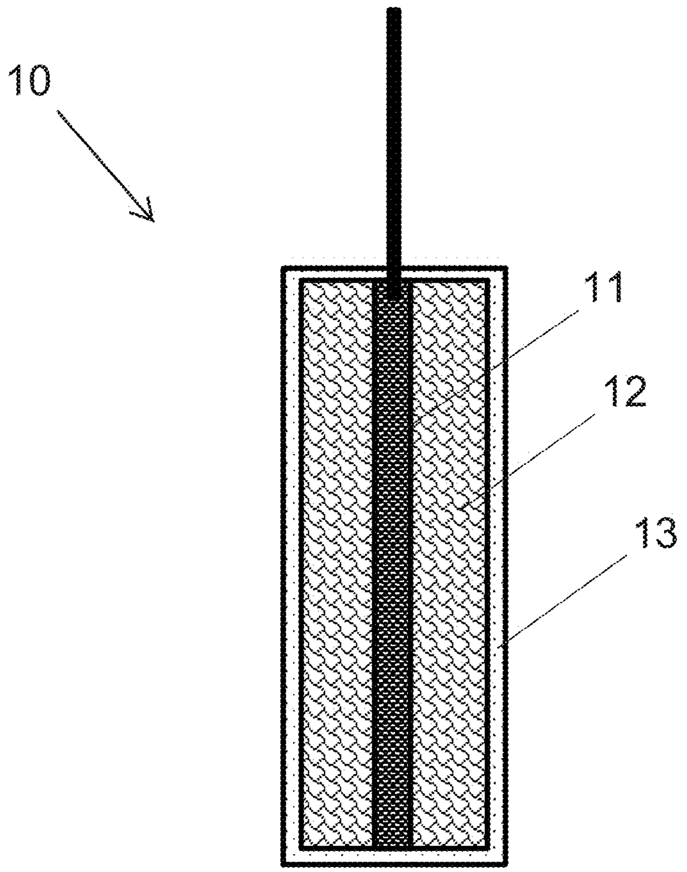

The procedure of extracting lithium from seawater using electrochemical intercalation and associated aspects are illustrated in FIGS. 1A-1F. FIG. 1A shows the water stability window marked by $H_2$ and $O_2$ evolution reactions in seawater. FIG. 1B shows lithium extraction steps. In the first step, the $FePO_4$ electrode and $NaFePO_4$ were used as working and counter electrodes, respectively, in seawater for Li intercalation with a high selective preference for lithium over sodium. Then, in Step 2, the working electrode was regenerated in a fresh solution to recover the lithium extracted. FIG. 1C shows the calculation of the lithium and sodium intercalation potential difference at initial lithium to sodium molar concentration using an $FePO_4$ electrode. FIG. 1D shows possible voltage profiles A, B and C that can be used in different electrochemical methods (A: continuously on, B: pulsed-rest, and C: pulsed-rest-reverse pulse-rest) are shown. FIG. 1E shows intercalation of lithium into the working electrode's crystalline structure during step 1. FIG. 1F shows a cross-sectional detail view of an exemplary working electrode 10.

Figure 11:
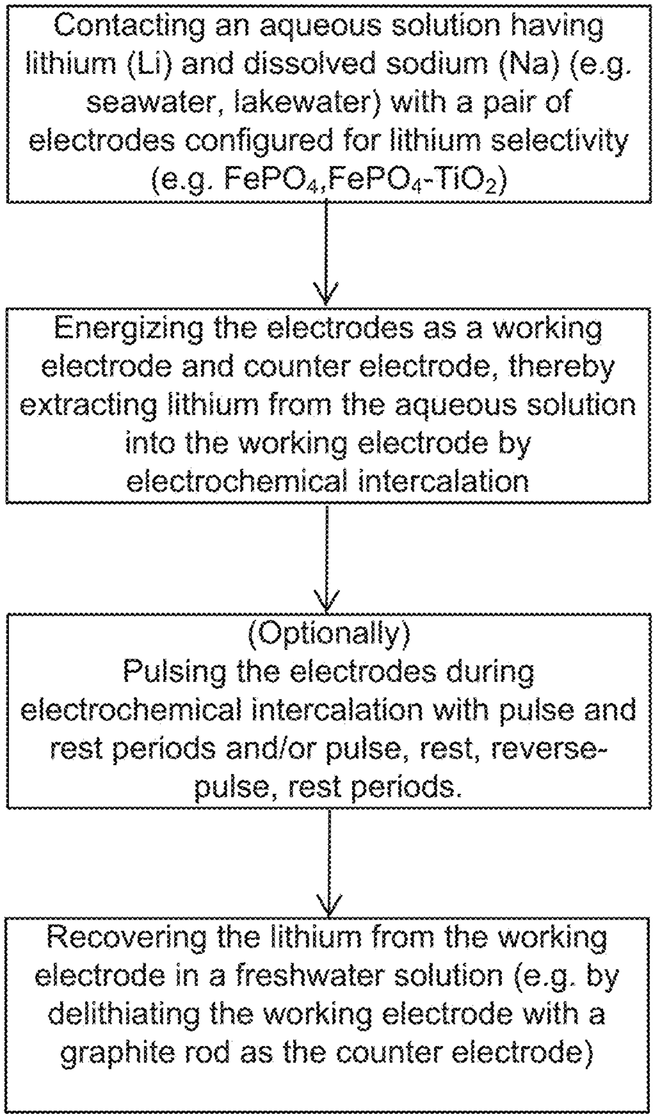
FIG. 11 depicts an exemplary method of extracting lithium, in accordance with some embodiments.

As can be seen in FIG. 1B, the system and methods utilize a working electrode 10 and counter electrode 20 disposed in a conduit or container 30 that contains the aqueous solution having both lithium and dissolved sodium salts (Na), as shown in Step 1 (upper left). The electrodes are then energized to allow intercalation of lithium into the crystalline structure of the working electrode 10, shown in Step 1 (bottom left). The aqueous solution is then removed and replaced with fresh water, as shown in Step 2 (upper right), with the working electrode 10 and a carbon counter electrode C. The electrodes are then energized to facilitate recover of the lithium from the crystalline structure into the freshwater solution, which can be readily process to obtain the lithium concentrated within, without the high concentration of dissolved sodium salts. It is appreciated that the conduit container can be part of a network of conduits/containers (not shown) to facilitate constant or intermittent flow of the aqueous solution from an external source, and periodic replacement with fresh water to facilitate recover of the lithium from the working electrode after extraction. FIG. 11 depicts an exemplary method of extracting lithium as described above.

As shown in FIG. 1B, in the first step, a host material was used as the working electrode to allow lithium intercalation into the crystal structure of the electrode, as shown in FIG. 1E. The host material selection is selected and configured such that during lithiation and delithiation, its potential should be within the water stable window (see FIG. 1A). In this example, the host material is $FePO_4$. Seawater has a pH of 8.2 which sets the water stable window to be −0.48 V vs. standard hydrogen electrode (SHE) to avoid $H_2$ evolution and 0.75 V vs SHE to avoid $O_2$ evolution, as shown in FIG. 1A). It is appreciated that the water stable window can vary based on the properties of the aqueous solution from which the lithium will be extracted and that the parameters (e.g. current/voltage) can be adjusted accordingly. In these experiments, $FePO_4$ from delithiated $LiFePO_4$ was used as the working electrode. The potential plateau of lithiation and delithiation with 1M Li salt solution for $FePO_4$ is ~3.4 V vs. Li metal which is 0.36 V vs. SHE and is stable in seawater.

Figure 6:
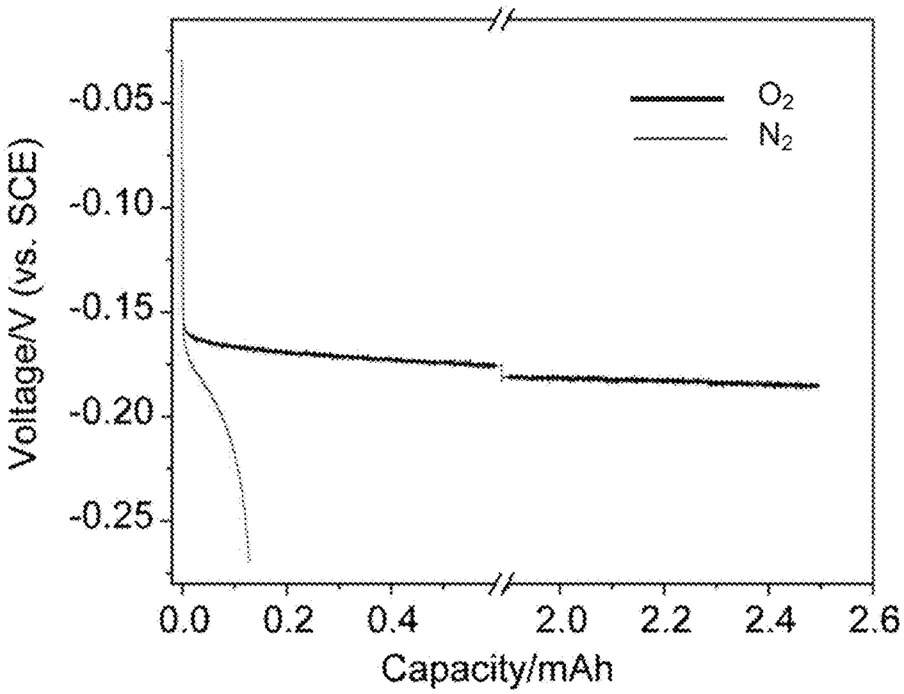
FIG. 6 shows the potential curve, in accordance with some embodiments.

Moreover, there is also selection criteria for the pairing counter electrode during the lithium extraction cycle. First, an $O_2$ evolution electrode needs to be eliminated due to several reasons: a) An $O_2$ evolution electrode can induce significant pH change to the seawater environment. lithium ion (~25 μM) comparing to hydroxide ion (~1 μM) has a higher concentration in seawater, even if 10% of the lithium is extracted, it would induce a significant acidification effect to seawater environment. b) The dissolved $O_2$ would diffuse to the negative electrode and get reduced to peroxide species. The $O_2$ reduction reaction in seawater (0.20V vs SHE) happens at a slightly higher potential to lithium intercalation when considering the real seawater lithium concentration of 180 ppb so that the $O_2$ reduction reaction would reduce the Faradaic efficiency of lithium extraction on the negative electrode (as shown in FIG. 6). (c) The peroxide species would damage the $FePO_4$ electrode permanently.

Accordingly, $NaFePO_4$ was chosen for use as the counter electrode. By utilizing $NaFePO_4$ counter electrode, sodium will be released into seawater during the lithium extraction cycle in Step 1. Since the amount of sodium released from the electrode is in much less concentration comparing to background sodium levels, this effectively minimizes the environmental impact to seawater. During the lithium extraction step, the two electrodes were disposed within the seawater and the system was kept in an $N_2$ atmosphere (see FIG. 1B). $FePO_4$ was the negative electrode to allow lithium ions to intercalate into the crystal structure. In the second step, the $FePO_4$ electrode filled with lithium is disposed within a fresh water-based recovery solution, and the lithium is released into the solution by a reverse bias while the $FePO_4$ electrode was regenerated.

The challenge of lithium extraction from seawater lies in the background of sodium ions. Lithium has similar chemistry to sodium but is found in a much lower concentration in seawater. $FePO_4$ has a lithium intercalation potential of ~0.36 V vs SHE while it has a sodium intercalation potential of ~0.19 V vs SHE. This thermodynamic preference of lithium intercalation can compensate for a molar concentration difference of ~0.0012 Li/Na. In brines or salt lake water, where the lithium to sodium concentration ratio is ~0.0018 to 0.3, the intercalation chemistry would be expected to be near 100% selectivity from the calculation as shown in FIG. 1C.

In the case of seawater, the concentration of lithium is ~0.180 ppm comparing to ~10,800 ppm for sodium. The low concentration ratio of $5\times10^{-5}$ of Li/Na would not compensate for the thermodynamic preference of lithium intercalation, so the sodium intercalation would compete with lithium to be intercalated into the electrode. On the other hand, the kinetics of lithium and sodium intercalation offers another preference for lithium. The activation barrier difference between lithium and sodium diffusion is ~0.05-0.2 eV with sodium possessing higher activation energy barrier. Considering the competition between lithium and sodium, different strategies were taken to promote lithium intercalation.

First, to increase the electrode and electrolyte (seawater) contact, a hydrophilic coating was introduced to the surface of the host material (e.g., $FePO_4$). Here, amorphous $TiO_2$ was selected as the coating material which was deposited by atomic layer deposition. It is appreciated that any suitable, compatible hydrophilic materials could be used and that the hydrophilic materials could be incorporated or applied to the electrode by various other approaches (e.g., alternative deposition techniques, films or encasement within a membrane). It has been shown that the diffusivity of lithium in amorphous $TiO_2$ was on the same order as $FePO_4$, therefore the thin coating would not increase the activation barrier for lithium diffusion.

Figure 2A:
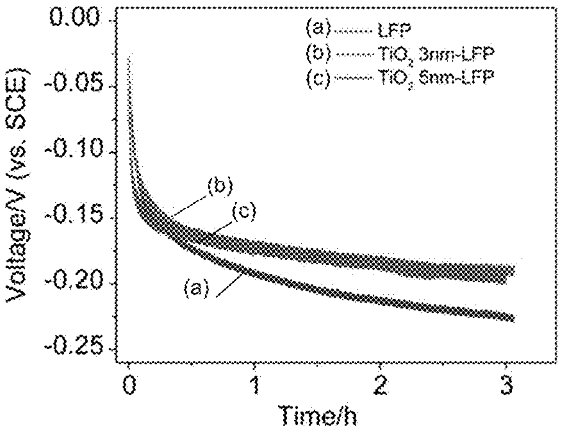
FIGS. 2A-2D shows intercalation potential curves and selectivity results, in accordance with some embodiments.
Figure 2B:
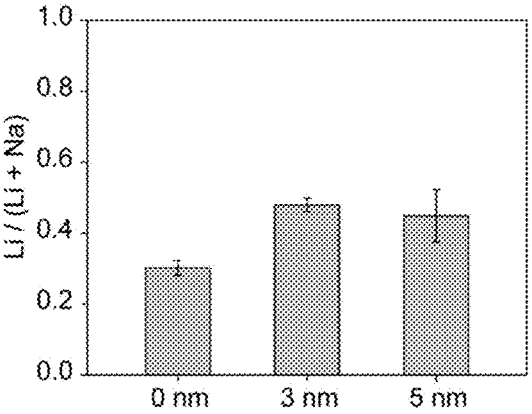

FIG. 1F shows a detail view of the working electrode 10 having a host material 12 with a crystalline structure (e.g. $FePO_4$) that is disposed on a conductive substrate 11 and which is encased by a hydrophilic layer 13 (e.g. $TiO_2$-coating). Two thickness, 3 nm and 5 nm of $TiO_2$ coating were investigated compared to the bare $FePO_4$ electrode. The thin layer of $TiO_2$ coating did not change the electrode conductivity significantly as shown in the electrochemical impedance spectroscopy (see FIG. 7). While 3 nm and 5 nm outer layers were tested here, it is appreciated that any suitably thin layer could be used, for example, a layer between 1 nm and 100 nm, typically between 1 nm and 20 nm, more typically between 1 nm and 10 nm. The electrode resistance was 1.53, 6.08 and 4.65Ω for 0 nm, 3 nm and 5 nm of $TiO_2$ coated $FePO_4$. During the seawater lithiation cycle, it can be seen from the potential curve shown in FIG. 2A that both 3 nm and 5 nm of $TiO_2$ coatings have lowered the overpotential for lithium insertion. The experiments then tested the Li and Na recovered from the electrode through a delithiation process in freshwater solution. It is shown in FIG. 2B that the lithium/(Li+Na) molar ratio was 30.2±2.1%, 48.0±1.9% and 44.9±7.4% for a $FePO_4$ electrode with 0 nm, 3 nm and 5 nm of $TiO_2$ coating. Since the 3 nm $TiO_2$ coating gave the highest selectivity, this condition was adopted for all the later electrochemical method selection tests. The coating test illustrates that the activation barrier for sodium intercalation is higher than lithium so that lowering the overpotential could help promote lithium intercalation.

Figure 2C:
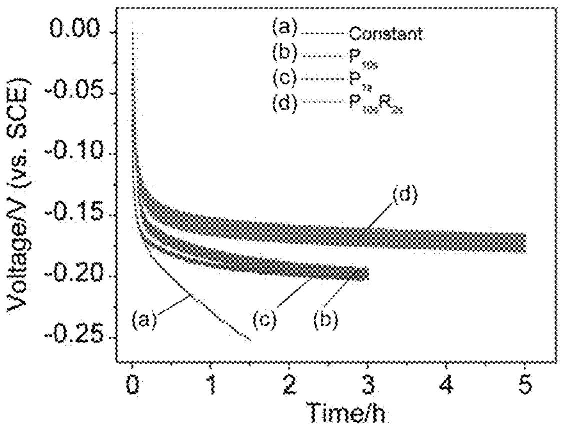
Figure 2D:
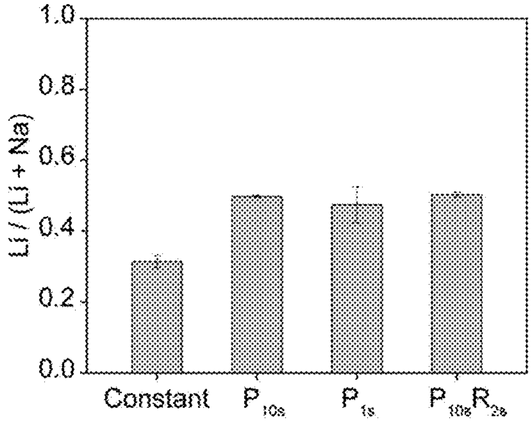

The next strategy adopted to improve the selectivity of lithium extraction is optimizing the electrochemical lithiation method. Different electrochemical intercalation methods would lead to different overpotentials to drive the lithium extraction process. The constant current lithiation method (e.g., FIG. 1D:A) was compared to pulse-rest (e.g., FIG. 1D:B) and pulse-rest-reverse pulse-rest methods (e.g., FIG. 1D:C). For the pulse-rest method, 10 s lithiation with 10 s rest ($P_{10\ s}$) and is lithiation with is rest ($P_{1\ s}$) was tested. The potential curves are shown in FIG. 2C. For the same capacity of lithium extraction, both pulse-rest method $P_{10\ s}$ and $P_{1\ s}$ showed ~0.05V smaller overpotentials than the constant current method. The electrode impedance was similar in all tests (shown in FIG. 8). As a result, the recovered lithium/(Li+Na) molar ratio was higher in pulsed electrochemical methods $P_{10\ s}$ and $P_{1\ s}$ of 49.7±0.35% and 47.4±5.1% than that in the constant current method of 31.4±1.7% (FIG. 2D). The pulsed lithiation method gave the electrode a rest period for lithium and sodium to redistribute among all the particles in the electrode and ensured a more uniform Li/Na content in all the particles which reduced the overpotential of intercalation. Besides the pulse-rest method, the pulse-rest-reverse pulse-rest method was also tested. In this method, in one cycle there is both a forward pulse and a reverse pulse. The forward pulse and its rest periods were both 10 s and the reverse pulse with the same amplitude and its rest periods were 2 s and 10 s ($P_{10\ s}R_{2\ s}$), respectively. The reverse pulse is thought to create a more uniform concentration front. The selectivity of this pulse-rest-reverse pulse-rest method was 50.2±0.78% as shown in FIG. 2D. It is also higher than the constant current method. The introduction of pulsed electrochemical methods was successful in facilitating lithium intercalation rather than Na. In the three pulsed methods, the first cycle selectivity was similar to an extraction ratio of Li/Na of ~1:1 which is equivalent to the selectivity of Li to Na of $1.8\times10^4$ from seawater. While specific pulse, reverse-pulse and rest periods are described above, it is appreciated that the advantages describes above can still be realized with differing durations in a pulsed method. For example, in the pulse-rest approach, the pulse and rest periods can be the same or differing durations. Although 10 s pulses are describes, in some embodiments, either of the pulse or rest can be of any duration between 1 s and 1 minute, typically between 5 s to 30 s, or between 5 s to 20 s. In the pulse, rest, reverse-pulse, rest approach, it is appreciated that each period can be the same or of differing durations between 1 s and 1 minute, typically, between 1 s to 30 s, or between 1 s to 20 s. In some embodiments, the reverse-pulse is of a shorter duration that than the forward pulse.

FIGS. 2A-2D shows: a) Intercalation potential curves in seawater of $FePO_4$ electrodes with 0 nm, 3 nm and 5 nm of $TiO_2$ coating; b) Li selectivity results using $FePO_4$ electrodes with different thicknesses of $TiO_2$ coatings; c) Intercalation potential curves in seawater using $FePO_4$ electrodes with 3 nm of $TiO_2$ coating with different electrochemical methods: constant current, $P_{10\ s}$, $P_{1\ s}$, and $P_{10\ s}R_{2\ s}$; and d) Li selectivity results using $FePO_4$ electrodes with 3 nm of $TiO_2$ coating with different electrochemical methods.

Figure 3:
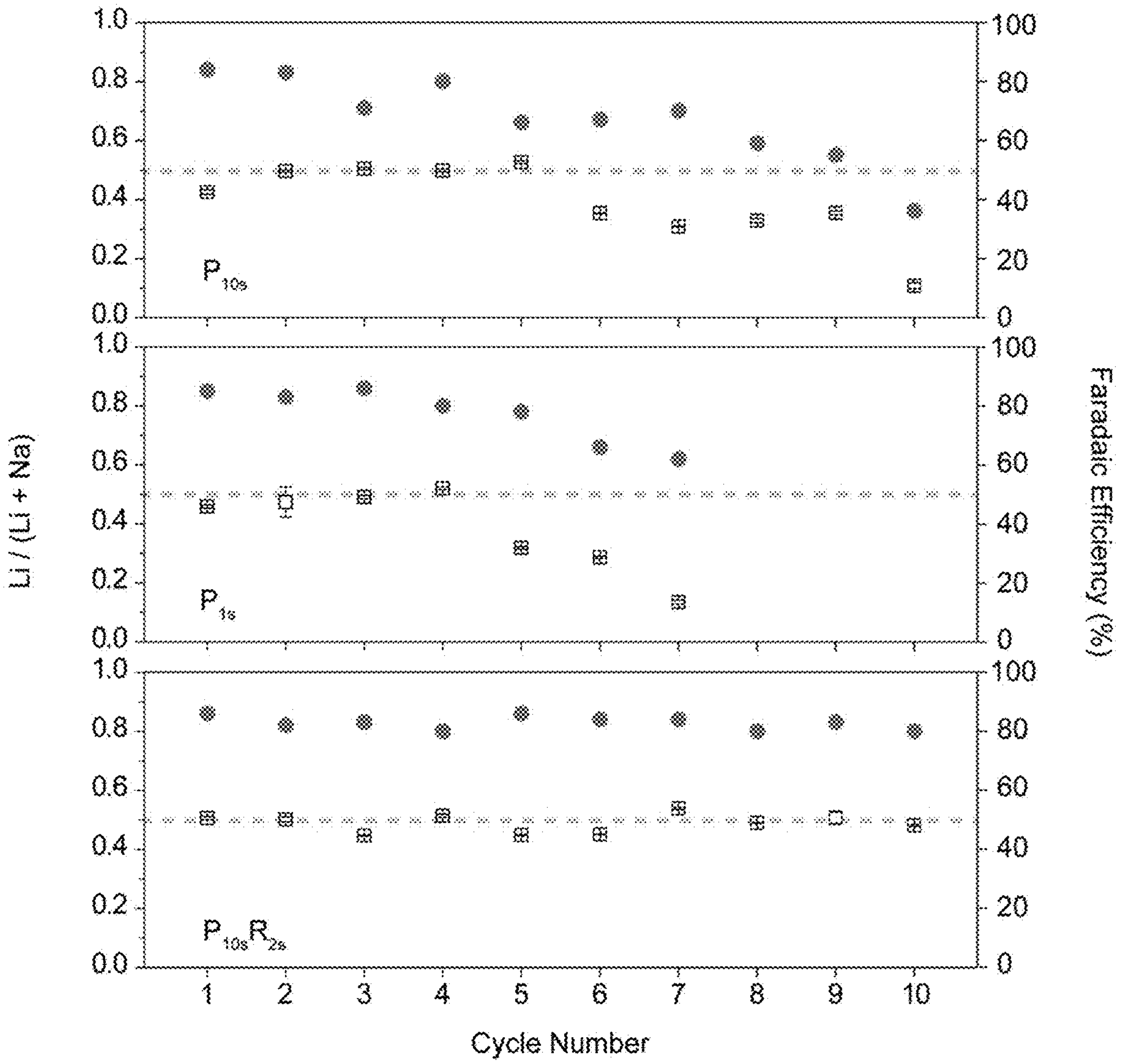
FIG. 3 shows selectivity and Faradaic efficiency results, in accordance with some embodiments.

The cycle stability of the three pulse electrochemical methods ($P_{10\ s}$, $P_{1\ s}$, and $P_{10\ s}R_{2\ s}$) was also studied. Identical electrodes were cycled 10 times for each pulsed electrochemical method. Each cycle involved the lithium extraction and recovery process. Both lithium selectivity and Faradaic efficiency were measured. During the cycle tests, these three methods showed an obvious difference in stability as shown in FIG. 3. In both pulse methods $P_{10\ s}$ and $P_{1\ s}$, the selectivity and Coulombic efficiency showed signs of decline. The decline was faster in the case of $P_{1\ s}$. The selectivity started to decline at the $5^{th}$ cycle from a Li/(Li+Na) molar ratio of ~50% to 31.9±0.40%. At the $7^{th}$ cycle, the Li/(Li+Na) molar ratio was only 13.5±0.68%. In $P_{10\ s}$, the selectivity started to decline at the $6^{th}$ cycle and before the $10^{th}$ cycle, the selectivity was between 30-36%. In the $10^{th}$ cycle, the selectivity dropped to 10.8±0.97%. However, for the case of the $P_{10\ s}R_{2\ s}$ method, there was no sign of instability of the electrode and the selectivity was ~50% for 10 cycles. The decline in electrode cycle stability in $P_{10\ s}$ and $P_{1\ s}$ methods could result from the co-intercalation behavior of lithium and sodium. During co-intercalation, the diffusivity of lithium and sodium was different, which could lead to local jamming from the slower diffusion sodium. In contrast, the reverse pulse and rest period would allow lithium and sodium to redistribute and decrease the local stress of the electrode. Also, it is though that the reverse pulse can help remove sodium from the electrode because sodium deintercalation has a lower potential than lithium deintercalation. This is beneficial to enhance the electrode's long-term stability.

A stability test was performed on the TiO2-coated LiFePO4 by directly soaking the electrode in seawater for 24 hours and measuring the electrode lithium and iron (Fe) content by dissolution. From the lithium and iron concentration, the back the mass loading of the LiFePO4 was calculated, which was similar to the original mass loading measured with an error of ~2% and +4%, respectively.

Figure 4:
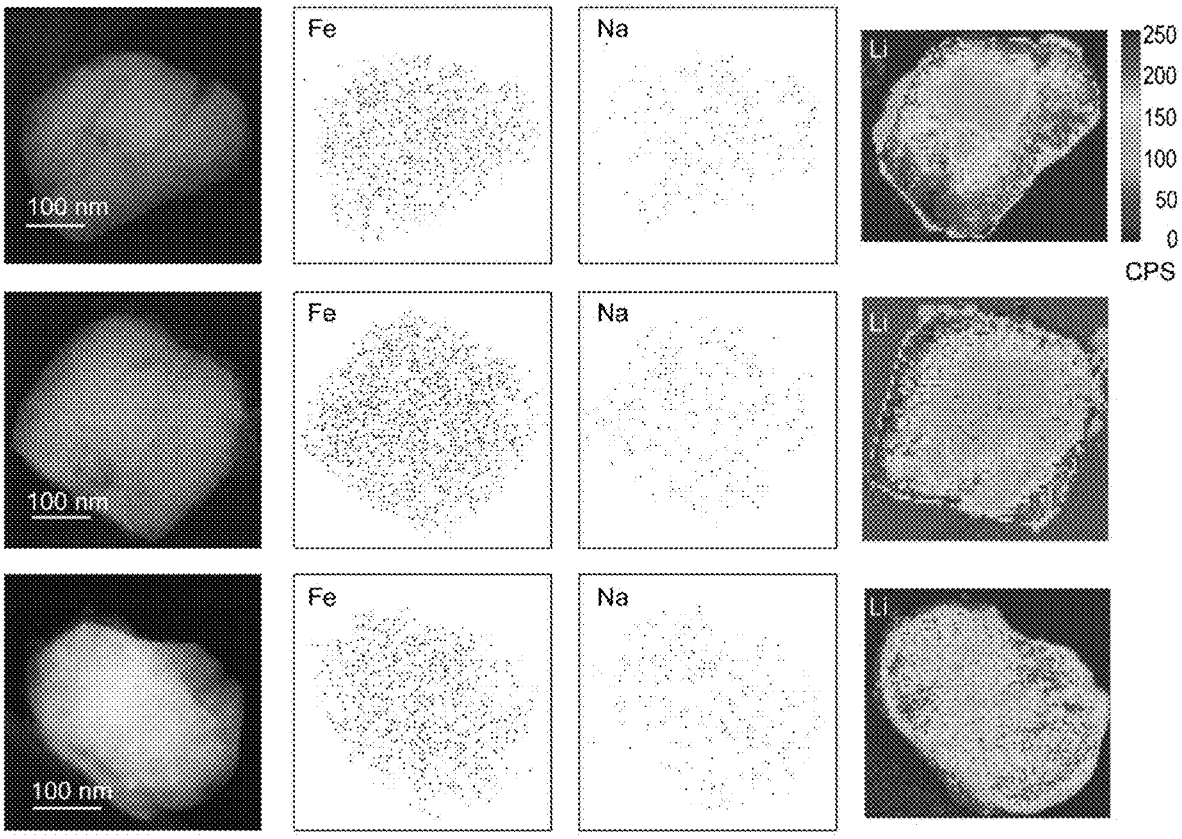
FIG. 4 shows single particle mappings, in accordance with some embodiments.

FIG. 3 shows lithium selectivity and Faradaic efficiency results for the stability test using different electrochemical methods. FIG. 4 shows TEM characterization of $FePO_4$ particles after 10 cycles of Li extraction and recovery using $P_{10\ s}R_{2\ s}$ electrochemical method. Panel from left to right: TEM image of $FePO_4$ particle, Fe EDX elemental mapping, Na EDX elemental mapping, and Li EELS elemental mapping. The $FePO_4$ particles were characterized in the $P_{10\ s}R_{2\ s}$ method using both scanning electron microscopy (SEM, see FIG. 9) and transmission electron microscopy (TEM, FIG. 4). Another intercalation was done after the $10^{th}$ cycle for electrode characterization. From the SEM images, there was only a slight change in the electrode morphology. After SEM imaging, the $FePO_4$ particles were sonicated off the electrode for TEM characterization. Single-particle mapping was shown in FIG. 4. Three particles were shown to represent the particles on the electrode. Lithium element was mapped with electron energy loss spectroscopy (EELS). Sodium and iron elements were mapped by energy-dispersive X-ray spectroscopy (EDX). Iron mapping was used as a reference for $LiFePO_4$.

The lithium EELS signal showed that the intercalation followed the phase transformation similar to sole lithium intercalation in battery cathodes with edges of higher concentration of lithium. The sodium mapping did not give the same feature where edges have higher concentrations. However, it was clear from the mapping that sodium existed uniformly in the particle surface which points to the fact of lithium and sodium co-exist in the structure. The co-intercalation was also confirmed using X-ray diffraction (XRD), shown in FIG. 10. The electrode showed both peaks from $LiFePO_4$ and $NaFePO_4$. From the morphology aspect, the particle remained its integrity after cycling, but small cracks were noticed on the particle which could come from the electrode expansion after intercalation.

Figure 5:
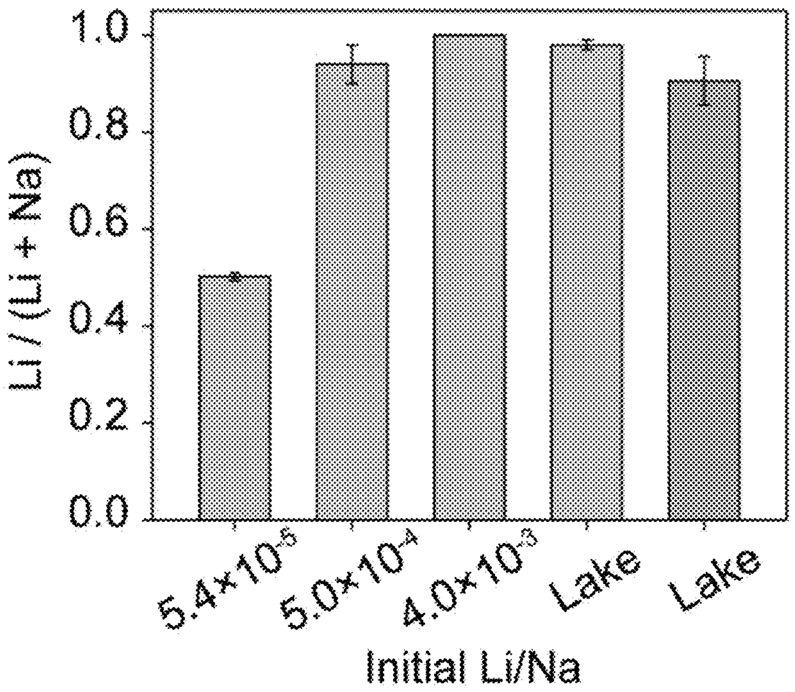
FIG. 5 shows lithium selectivity results, in accordance with some embodiments.

Finally, the electrochemical intercalation was demonstrated to work for artificial brines with different lithium to sodium molar ratio and for salt lake water obtained from Salt Lake in Utah. Artificial solutions with lithium to sodium ratio of $5.4\times10^{-5}$, $5.0\times10^{-4}$ and $4.0\times10^{-3}$ were tested. Li to Na ratio of $5.4\times10^{-5}$ is similar to the seawater case. As shown in FIG. 5, using the same $P_{10\ s}$ electrochemical method, the selectivity was 50.2±0.78%, 94.3±4.0% and ~100% (Na below detection limit), respectively. This points to the thermodynamic preference of lithium to sodium in intercalation to $FePO_4$ material as shown in FIG. 1C. Lake water from Salt Lake in Utah was also collected. Through inductively coupled plasma mass spectrometry (ICP-MS) measurement, the lake water contains 21.4 ppm of Li and $4.26\times10^{4}$ ppm of Na. Both lithium and sodium concentrations were higher than that in seawater and the Li/Na ratio is $1.6\times10^{-3}$. At the same $P_{10\ s}$ electrochemical method where the current is C/5, the recovered Li/(Li+Na) molar ratio was 98.1±1.0%. A higher current rate of 1 C for the $P_{10\ s}$ electrochemical method was also tested. The recovered Li/(Li+Na) molar ratio was 90.6±4.7%. The higher current test represents the case when higher productivity was needed, and the selectivity result showed great potential for the electrochemical Li extraction to be both selective and with high yield in brine mining. In real-world applications, an additional step similar to that in brine mining may be added after the current recovery step to precipitate lithium to $Li_2CO_3$ for further use.

FIG. 5 shows lithium selectivity results using $P_{10\ s}$ electrochemical methods and $FePO_4$ electrode with 3 nm $TiO_2$ coating in solutions with different initial Li to Na molar ratio and authentic lake water. For lake water, two different current rates were tested. C/5 current rate result was shown in left four bars and 1 C current rate result was shown in the right most bar.

In summary, these experiments have demonstrated the successful extraction of lithium from both seawater and salty lake water with the $FePO_4$ electrode using the electrochemical intercalation method. It has been shown that by lowering the intercalation potential through the hydrophilic coating and also pulsed electrochemical method intercalation, lithium selectivity can be enhanced. By using the pulse-rest-reverse pulse-rest method, 10 cycles of stable lithium extraction from seawater with 1:1 Li/Na recovery was achieved, which is equivalent to the high selectivity of $1.8\times10^{4}$. While this demonstration of electrochemical lithium extraction from seawater shows great potential, deployment of this method would require hundreds to thousands of electrochemical cycles before electrode replacement is required to maintain high Faradic efficiency. Hence, even a small amount of intercalation of sodium into the electrode material after repeated cycles would lead to stress cracks and a loss of electrochemical capacity. In one aspect, the invention utilizes hydrophilic interface coatings that will serve as a barrier against sodium intrusion into the electrode. Furthermore, it would be beneficial to provide for filtering of micro, nano and molecular materials present in sea water (or alternatively salt lake water or produced water from oil recovery) to prevent long-term fouling of the electrodes. These obstacles are surmountable, and the concepts described herein offers the prospect of securing an adequate supply of lithium to allow the massive deployment of electric vehicles.

Methods of Manufacture

Figure 12:
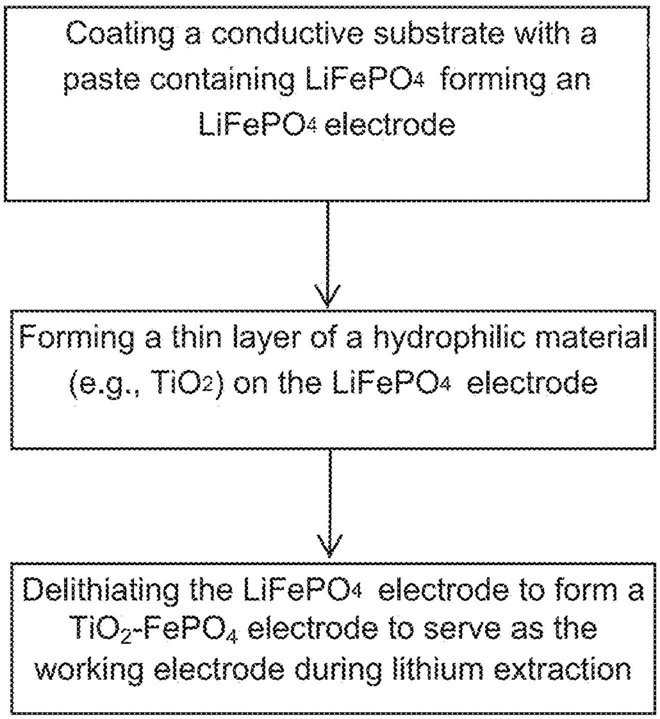
FIG. 12 schematically depicts an exemplary method of forming the working electrode, in accordance with some embodiments.

Electrode synthesis and electrochemical method: The $LiFePO_4$ electrodes were made by coating a paste containing 80% $LiFePO_4$ (MTI), 10% polyvinylidene fluoride (PVDF, MTI), 10% of conductive carbon black (MTI) onto a 1 $cm^2$ carbon felt substrate (99.0%, 3.18 mm thick, Alfa Aesar). $TiO_2$ was coated onto the $LiFePO_4$ electrode using atomic layer deposition (ALD) at 200° C., 0.4 Å/cycle in $O_2$ plasma (Fiji 2, Cambridge Nanotech) with a tetrakis(dimethylamido)titanium (IV) precursor heated at 75° C. To obtain the $TiO_2$—$FePO_4$ electrode for Li extraction, the electrode was delithiated first in $MgCl_2$ solution with C/5 rate to a cutoff voltage of 0.2 V vs. saturated calomel electrode (SCE). FIG. 12 schematically depicts an exemplary method of forming the working electrode as described above.

Figure 13:
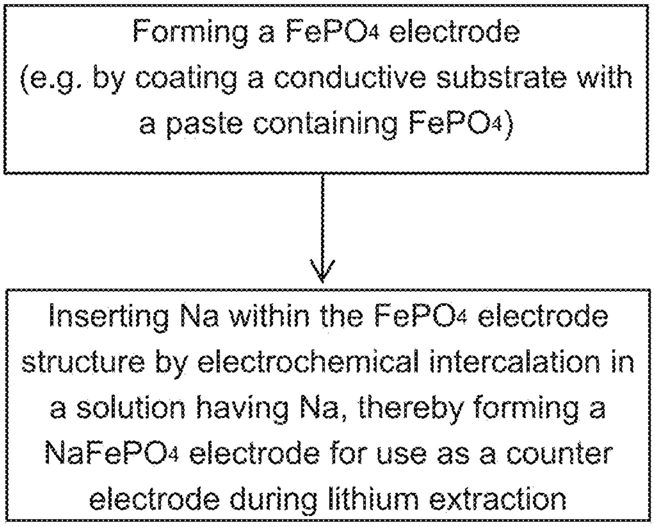
FIG. 13 schematically depicts an exemplary method of forming the counter electrode, in accordance with some embodiments.

Seawater was collected at Half Moon Bay, California and filtered by a 0.2 μm filtration unit (Corning) to remove particles and microorganisms. Lithium extraction was carried out in a 300 mL filtered seawater in the $N_2$ atmosphere using either direct current or pulsed electrochemical method at a current rate of C/5 with SCE as the reference electrode and $NaFePO_4$ as the counter electrode. The $NaFePO_4$ electrode was obtained by running the intercalation process using a $FePO_4$ electrode in 1M NaCl solution. FIG. 13 schematically depicts an exemplary method of forming the counter electrode as described above. In the cycle stability test, for each cycle, the intercalation capacity used was 20% to ensure that lithium concentration in seawater did not decrease to below 60% of its initial concentration.

Li extraction selectivity: After finishing the Li extraction in seawater, the electrode was delithiated in $MgCl_2$ solution with C/5 rate to a cutoff voltage of 0.2 V vs. SCE with a graphite rod (Sigma-Aldrich, 99.995%) as the counter electrode. The solution before and after the delithiation process was collected for Inductively Coupled Plasma Mass Spectrometry (ICP-MS) for lithium and sodium concentration measurement.

Characterization: Scanning electron microscopy (SEM, FEI Nova NanoSEM 450) with beam energies of 5 kV was used for imaging. All TEM characterizations were carried out using a FEI Titan environmental (scanning) transmission electron microscope (E(S)TEM) operated at 300 kV. The microscope was equipped with an aberration corrector in the image-forming (objective) lens, which was tuned before each sample analysis. XRD (PANalytical Material Research Diffractometer) was carried out using Cu Kα radiation.

Figure 7:
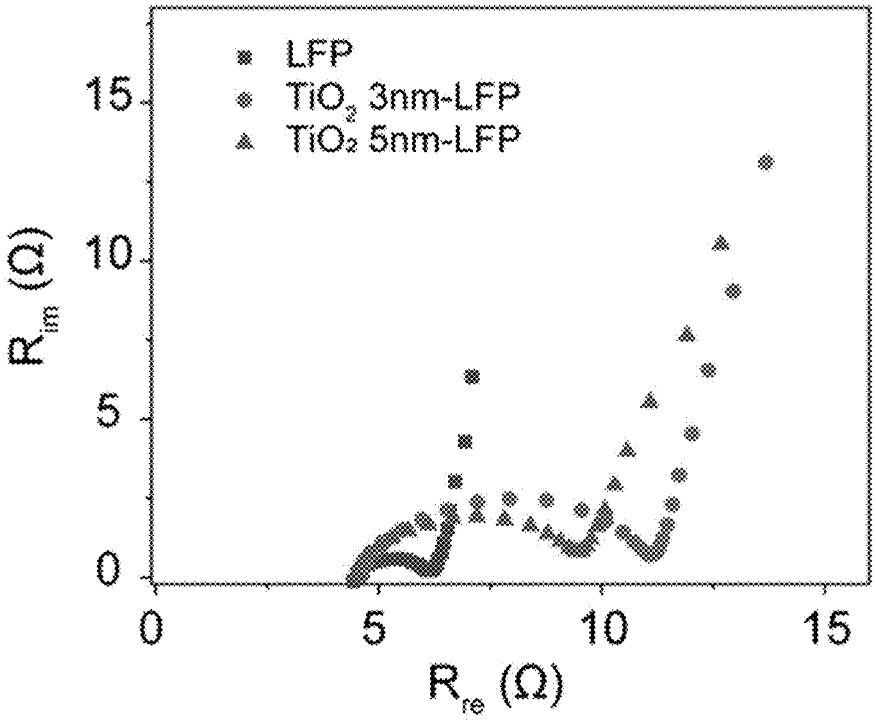
FIG. 7 shows electrochemical impedance spectroscopy of an $LiFePO_4$ electrode, in accordance with some embodiments.
Figure 8:
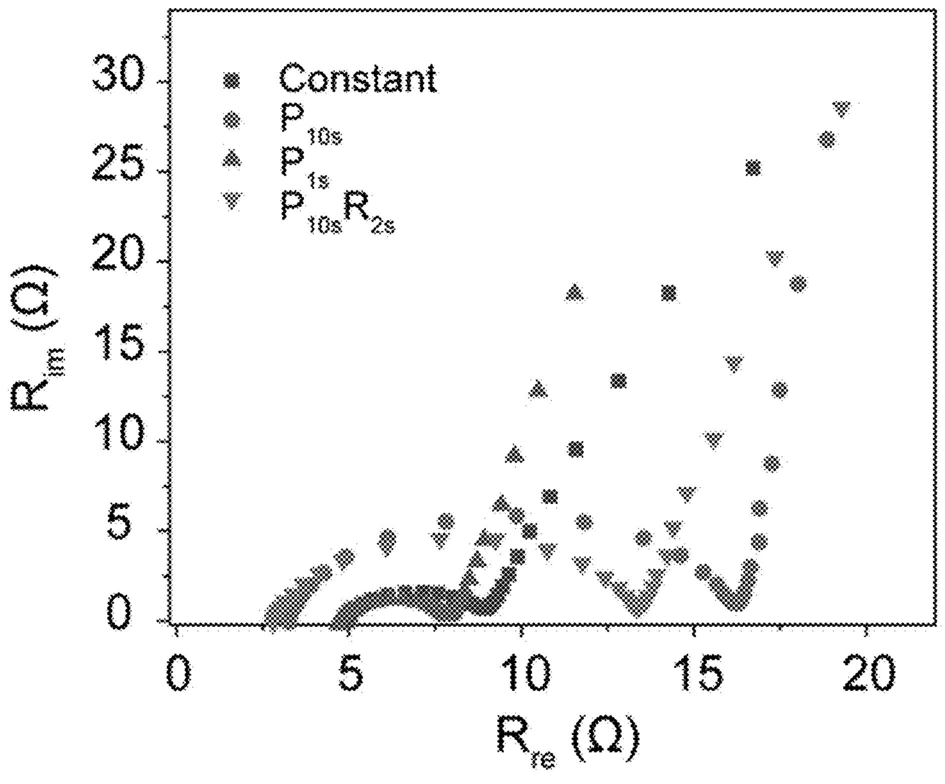
FIG. 8 shows electrochemical impedance spectroscopy of the 3 nm of $TiO_2$ coated $FePO_4$ electrodes, in accordance with some embodiments.
Figure 9:
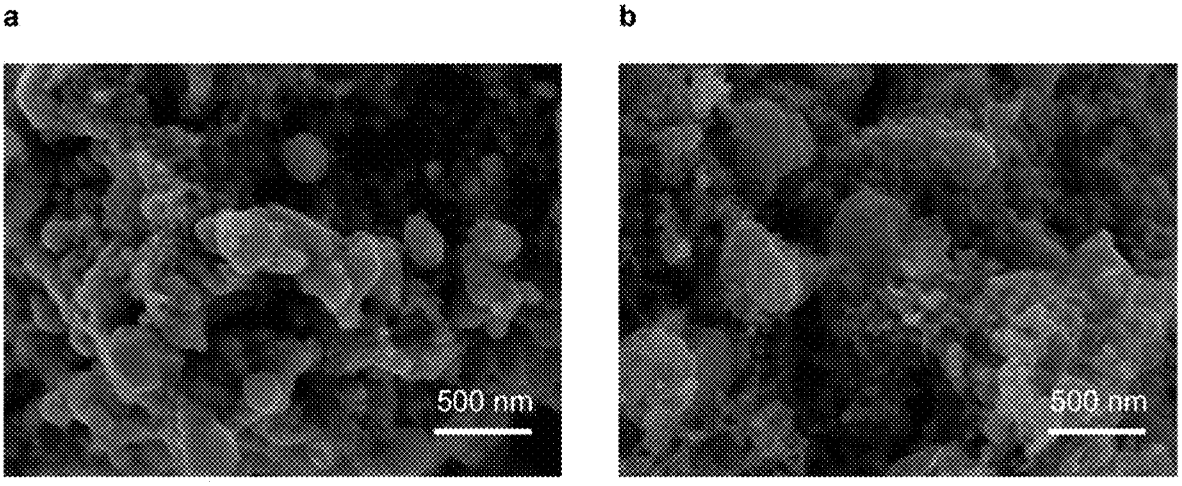
FIG. 9 shows SEM images of the 3 nm $TiO_2$ coated $FePO_4$ electrodes, in accordance with some embodiments.
Figure 10:
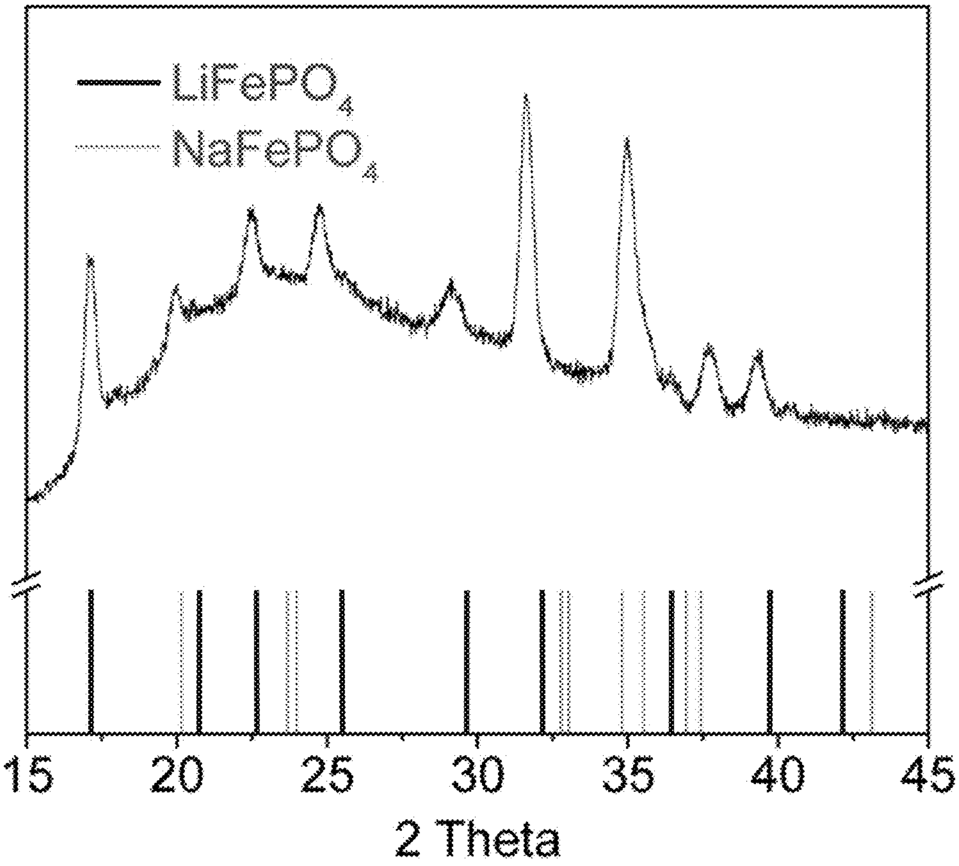
FIG. 10 shows an XRD image of the 3 nm $TiO_2$ coated $FePO_4$ electrodes, in accordance with some embodiments.

FIGS. 6-10 show supplemental figures. FIG. 6 shows the potential curve of two 3 nm of $TiO_2$ coated $FePO_4$ electrodes with similar mass loading running at constant reducing current (C/5 rate) in seawater exposed to different atmosphere: $O_2$ and $N_2$. When $O_2$ is present, the reduction reaction is dominated by $O_2$ reduction reaction rather than lithium intercalation. FIG. 7 shows electrochemical impedance spectroscopy of $LiFePO_4$ electrode with 0 nm, 3 nm and 5 nm of $TiO_2$ coatings. FIG. 8 shows electrochemical impedance spectroscopy of the 3 nm of $TiO_2$ coated $FePO_4$ electrodes in the selectivity study using difference electrochemical methods. FIG. 9 shows SEM images showing the 3 nm $TiO_2$ coated $FePO_4$ electrodes before (a) and after (b) the 10 cycles stability test using the pulse-rest-reverse pulse-rest method. FIG. 10 shows an XRD image showing of 3 nm $TiO_2$ coated $FePO_4$ electrodes after the 10 cycles stability test using the pulse-rest-reverse pulse-rest method. $LiFePO_4$ reference (JCPDS 040-1499). $NaFePO_4$ reference (JCPDS 029-1216).

In the foregoing specification, the invention is described with reference to specific embodiments thereof, but those skilled in the art will recognize that the invention is not limited thereto. Various features, embodiments and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art. Each of the references cited herein are incorporated herein by reference for all purposes.

What is claimed is:

1. A method of extracting lithium from an aqueous solution having lithium (Li) and dissolved sodium (Na), the method comprising:

providing a pair of electrodes in contact with the aqueous solution, the pair of electrodes being configured for lithium selectivity;

extracting lithium from the aqueous solution by electrochemical intercalation into a first electrode of the pair of electrodes, wherein the electrochemical intercalation is applied voltage pulsed in cycles according to a pulsed electrochemical intercalation cycle that comprises a pulse period then a rest period then a reverse pulse period then another rest period; and recovering the lithium extracted into the first electrode into a freshwater solution.

2. The method of claim 1, wherein the pair of electrodes comprise $FePO_4$ electrodes configured for lithium selectivity.

3. The method of claim 2, wherein at least the first electrode has an outer layer of a hydrophilic material.

4. The method of claim 3, wherein the hydrophilic material is $TiO_2$.

5. The method of claim 1, wherein lithium to sodium recovery is 50:1 or greater in lake water and 1:1 in seawater.

6. The method of claim 5, wherein the aqueous solution is a seawater solution having a sodium concentration of about 10 mg/L or higher.

7. The method of claim 5, wherein the aqueous solution is lake water with an initial Li/Na ratio of $1.6\times10^{-3}$.

8. The method of claim 1, wherein the electrochemical intercalation is performed at a constant current applied with the electrodes.

9. The method of claim 1, wherein any or all of:
the pulse period is between 1s and 30s;
the rest period is between 1s and 30s; and
the reverse-pulse period is between 1s and 30s.

10. The method of claim 1, wherein the reverse-pulse period is less than the pulse period in duration.

11. The method of claim 1, wherein a voltage applied in the electrochemical intercalation is within a water stable window of the aqueous solution for lithium extraction and recovery.

12. The method of claim 1, wherein the pair of electrodes comprises a $FePO_4$ electrode and a $NaFePO_4$ electrode.

13. The method of claim 12, wherein at least the $FePO_4$ electrode is coated with a layer of $TiO_2$.

14. The method of claim 1, wherein any or all of:
the pulse period is between 1s and 30s; and
the rest period is between 1s and 30s.

15. The method of claim 1, wherein any of the pulse, reverse-pulse and rest periods can be any duration between 0.5 seconds and 5 minutes.

* * * * *